(12) United States Patent
Muchherla et al.

(10) Patent No.: US 11,449,271 B2
(45) Date of Patent: Sep. 20, 2022

(54) IMPLEMENTING FAULT TOLERANT PAGE STRIPES ON LOW DENSITY MEMORY SYSTEMS

(71) Applicant: Micron Technology, Inc., Boise, ID (US)

(72) Inventors: Kishore Kumar Muchherla, Fremont, CA (US); Mark A. Helm, Santa Cruz, CA (US); Giuseppina Puzzilli, Boise, ID (US); Peter Feeley, Boise, ID (US); Yifen Liu, Boise, ID (US); Violante Moschiano, Avezzano (IT); Akira Goda, Tokyo (JP); Sampath K. Ratnam, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/079,048

(22) Filed: Oct. 23, 2020

(65) Prior Publication Data

US 2021/0200461 A1  Jul. 1, 2021

Related U.S. Application Data

(60) Provisional application No. 62/955,034, filed on Dec. 30, 2019.

(51) Int. Cl.
*G06F 3/06* (2006.01)

(52) U.S. Cl.
CPC .......... *G06F 3/0655* (2013.01); *G06F 3/0604* (2013.01); *G06F 3/0644* (2013.01); *G06F 3/0679* (2013.01)

(58) Field of Classification Search
CPC .... G06F 3/0655; G06F 3/0604; G06F 3/0644; G06F 3/0679
See application file for complete search history.

(56) References Cited

U.S. PATENT DOCUMENTS

| | | | | |
|---|---|---|---|---|
| 8,724,401 | B2* | 5/2014 | Friendshuh | G11C 16/0483 365/185.33 |
| 2005/0102480 | A1* | 5/2005 | Yagisawa | G06F 11/2084 711/162 |
| 2008/0007999 | A1* | 1/2008 | Park | G11C 8/08 365/185.02 |
| 2015/0277802 | A1* | 10/2015 | Oikarinen | G06F 3/064 711/114 |
| 2017/0249211 | A1* | 8/2017 | Hoei | G06F 3/0688 |

(Continued)

*Primary Examiner* — Ryan Bertram
(74) *Attorney, Agent, or Firm* — Lowenstein Sandler LLP

(57) ABSTRACT

An example memory sub-system comprises: a memory device; and a processing device, operatively coupled with the memory device. The processing device is configured to: receive a first host data item; store the first host data item in a first page of a first logical unit of a memory device, wherein the first page is associated with a fault tolerant stripe; receive a second host data item; store the second host data item in a second page of the first logical unit of the memory device, wherein the second page is associated with the fault tolerant stripe, and wherein the second page is separated from the first page by one or more wordlines including a dummy wordline storing no host data; and store, in a third page of a second logical unit of the memory device, redundancy metadata associated with the fault tolerant stripe.

20 Claims, 9 Drawing Sheets

(56) References Cited

U.S. PATENT DOCUMENTS

| | | | |
|---|---|---|---|
| 2018/0046231 A1* | 2/2018 | Raghu | G06F 3/0616 |
| 2018/0129430 A1* | 5/2018 | Kang | G06F 3/0619 |
| 2019/0171522 A1* | 6/2019 | Chang | G06F 12/0246 |
| 2020/0409808 A1* | 12/2020 | Seetharaman | G11C 29/44 |

* cited by examiner

IMPLEMENTING FAULT TOLERANT PAGE STRIPES ON LOW DENSITY MEMORY SYSTEMS

REFERENCE TO RELATED APPLICATION

This application claims the benefit of U.S. Provisional Patent Application No. 62/955,034, filed Dec. 30, 2019, the entirety of which is incorporated herein by reference.

TECHNICAL FIELD

The present disclosure generally relates to memory systems, and more specifically, relates to implementing fault tolerant page stripes on low density memory systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure.

FIG. 6 schematically illustrates yet another example redundancy scheme of a memory device, in accordance with embodiments of the present disclosure.

FIG. 7 schematically illustrates yet another example redundancy scheme of a memory device, in accordance with embodiments of the present disclosure.

DETAILED DESCRIPTION

Figure 1:
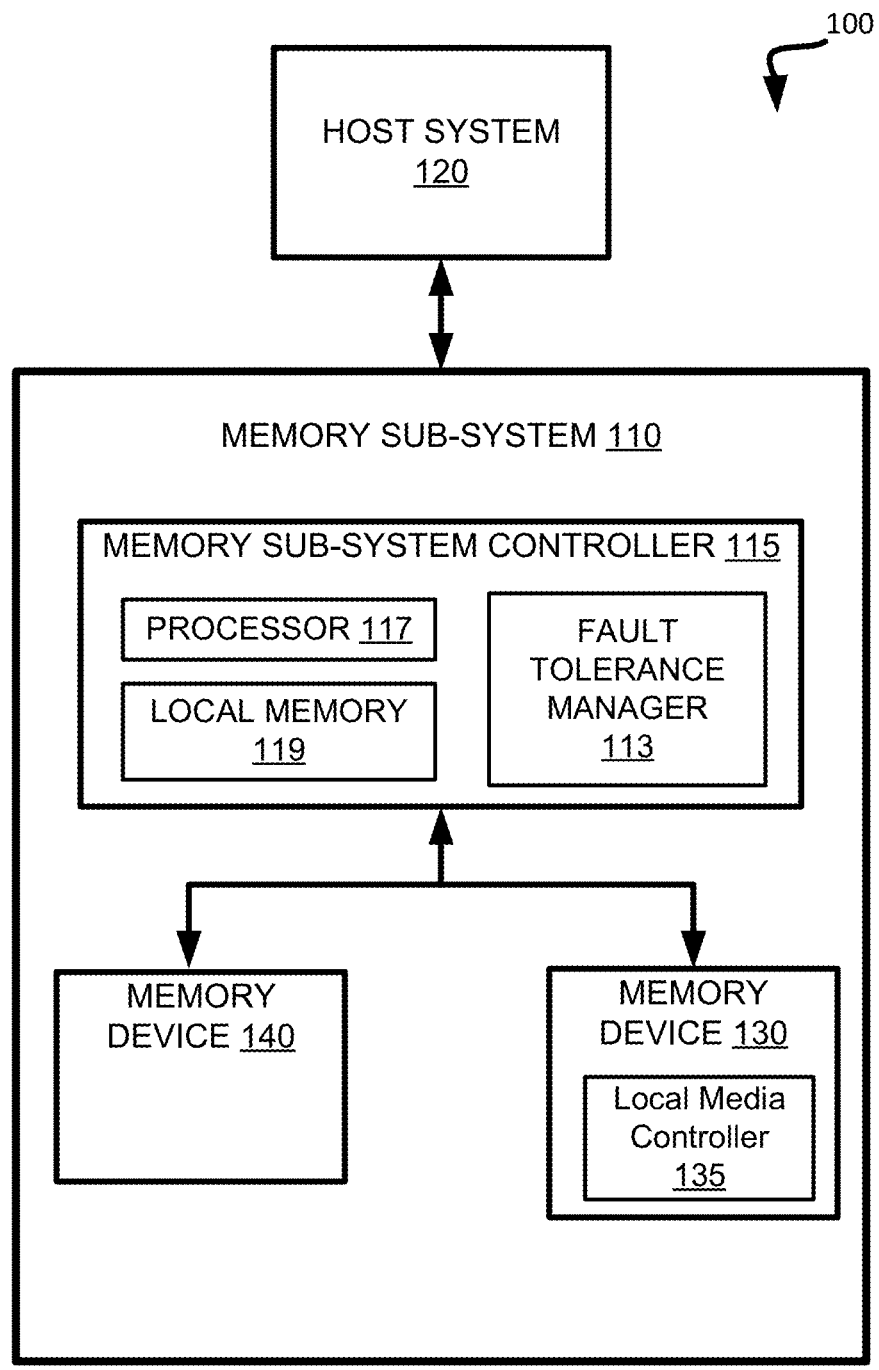
FIG. 1 illustrates an example computing system that includes a memory sub-system in accordance with some embodiments of the present disclosure.

Aspects of the present disclosure are directed to storing data for a fault tolerant stripe at locations based on a boundary of a memory device. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such memory devices. The host system can provide data to be stored at the memory sub-system and can request data to be retrieved from the memory sub-system.

A memory device can be a non-volatile memory device, which is a package of one or more dice. The dice in the packages can be assigned to one or more channels for communicating with a memory sub-system controller. The non-volatile memory devices include cells (i.e., electronic circuits that store information), that are grouped into pages to store bits of data. One example of non-volatile memory devices is a negative-and (NAND) memory device. Other examples of non-volatile memory devices are described below in conjunction with FIG. 1.

Various memory sub-systems can implement fault tolerant redundancy schemes, such as a redundant array of independent NAND (RAIN), for error checking and correction. A fault tolerant redundancy scheme can store host data in groups of pages, referred herein as fault tolerant stripes, such that each stripe includes a redundancy metadata page (e.g., a parity page), thus enabling for the data to be reconstructed if one of the pages of the stripe fails.

A memory device can include multiple arrays of memory cells grouped by wordlines. Failure of the memory device at a particular wordline can result in the data stored at the wordline to be at least partially lost. Furthermore, a defect that results in the failure of a particular wordline can further trigger failures of other wordlines that are proximate to that wordline. Thus, a defect can cause the loss of multiple data pages of the fault tolerant stripe at different locations (e.g., at different wordlines). If multiple data pages of the same fault tolerant stripe are located at proximate wordlines, too many host data elements can be lost simultaneously, thus rendering impossible reconstruction of the lost host data elements based on the available redundancy metadata. Accordingly, storing data pages of a fault tolerant stripe at proximate wordlines can cause the loss of data of the fault tolerant stripe in the event of a failure of the memory device.

Aspects of the present disclosure address the above and other deficiencies by storing the host data in fault tolerant stripes of a specified size, which can be predetermined in order to limit the overprovisioning penalty caused by implementing the fault tolerant scheme. Each fault tolerant stripe can include multiple data pages, while the last page of the fault tolerant stripe is dedicated to storing the redundancy metadata, which can be utilized for error detection and correction. Such a fault tolerant stripe can be formed utilizing multiple pages having sequential page numbers from every plane of every logical unit, provided that the pages residing within the same plane have sufficient wordline separation (e.g., are separated by at least a predetermined number of wordlines that include a deck separation wordline). The fault tolerant stripe size can be dynamically adjusted in order to provide the requisite wordline separation, based on the layout of the memory device, as explained in more detail herein below.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device (e.g., a processor).

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks. "Block" herein shall refer to a set of contiguous or non-contiguous memory pages. An example of "block" is "erasable block," which is the minimal erasable unit of memory, while "page" is a minimal writable unit of memory. Each page includes of a set of memory cells.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a fault tolerance manager 113 that manages storing the host data in a fault tolerant manner. In some embodiments, the memory sub-system controller 115 includes at least a portion of the fault tolerance manager 113. For example, the memory sub-system controller 115 can include a processor 117 (processing device) configured to execute instructions stored in local memory 119 for performing the operations described herein.

In some embodiments, the fault tolerance manager 113 is part of the host system 110, an application, or an operating system.

The fault tolerance manager 113 can be employed to implement fault tolerant layouts for storing host data at the memory device 130. As the host data is coming in, the fault tolerance manager 113 can program the pages of the memory device to form fault tolerant stripes of a specified size, which can be predetermined in order to limit the overprovisioning penalty caused by implementing the fault tolerant scheme. Each fault tolerant stripe can include multiple data pages, while the last page of the fault tolerant stripe is dedicated to storing the redundancy metadata, which can be utilized for error detection and correction. Such a fault tolerant stripe can be formed utilizing multiple pages having sequential page numbers from every plane of every logical unit of at least a subset of logical units of the memory device, provided that the pages residing within the same plane have sufficient wordline separation (e.g., are separated by at least a predetermined number of wordlines that include a deck separation wordline).

The redundancy metadata can be computed by summing, e.g., by the exclusive disjunction (XOR) operation, the contents of the pages as the pages are programmed (i.e., as the contents of the pages is stored to the memory device), and the intermediate result of XOR operations can be stored in a memory until the fault tolerant stripe is closed (i.e., until the metadata is written to the last page of the fault tolerant stripe). Since the pages have sequential page numbers, no additional memory is needed for storing the intermediate XOR results, as the XOR result of pages #i can be continued to pages #i+1. After the last data page of the fault tolerant stripe is programmed, the XOR result is written to the memory device. The fault tolerant stripe size can be dynamically adjusted in order to provide the requisite wordline separation, based on the layout of the memory device, as described in more detail herein below.

Figure 2:
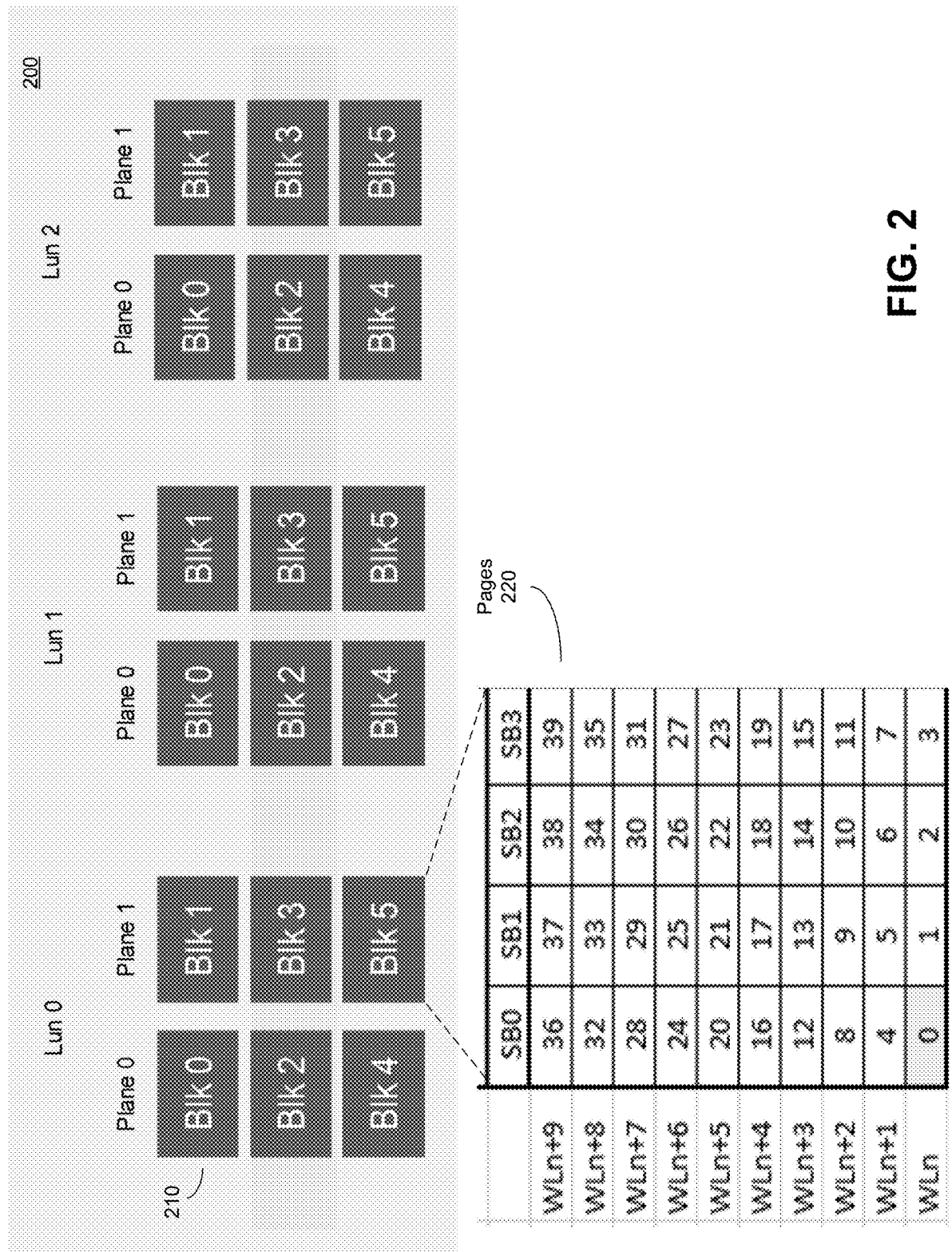
FIG. 2 schematically illustrates an example layout of a memory device, in accordance with embodiments of the present disclosure.

FIG. 2 schematically illustrates an example layout 200 of a memory device, in accordance with embodiments of the present disclosure. As noted herein above and schematically illustrated by FIG. 2, host data can be stored on a memory device, which can include a plurality of logical units (also referred to as "LUNs" or "dies"). Each logical unit can include multiple blocks 210 that reside on a plurality of planes. Each block can include a plurality of pages 210 that are grouped by respective wordlines $WL_n$-$WL_{n+k}$. Programming and/or erase operations can be simultaneously performed on two or more pages, provided that each page is residing on a respective plane.

Multiple blocks can be logically combined to form a superblock SB0-SB3, which includes at least one block from each plane of each logical unit. Programming operations with respect to the memory device can be performed by superblocks, i.e., by writing the host data to the pages of one superblock after writing the host data to the pages of another superblock.

The memory subsystem controller can store the host data in a fault tolerant manner, by writing the host data sequentially to one page after another, such that the pages are grouped into fault tolerant stripes. Each fault tolerant stripe includes a certain number of data pages (i.e., pages that store host data) and a redundancy metadata page that stores the metadata to be used for error detection and recovery. As noted herein above, the redundancy metadata can be represented by parity metadata, such that each bit of the metadata page of a fault tolerant stripe can be produced by performing bitwise exclusive disjunction (also referred to as "XOR")

operation of respective bits of data pages of the fault tolerant stripe. Such a redundancy scheme would provide fault tolerance in situations when no more than one page of a given fault tolerant stripe is faulty. The faulty page can be reconstructed by performing bitwise exclusive disjunction of all remaining data pages and the metadata page.

Since the above-described fault tolerant scheme allows for no more than one faulty page per fault tolerant stripe, no pages sharing one or more adjacent wordlines within a single plane of any given logical unit can be present in a fault tolerant stripe, since the presence of one faulty page on a given wordline can be indicative of other pages on the same wordline being also faulty. In other words, no more than one page from any given wordline of any given plane of a logical unit can be present in a fault tolerant stripe. Thus, in some implementations, a fault tolerant stripe can include a page from every plane of every logical unit of the memory device, such that all but one pages of the fault tolerant stripe are utilized to store the host data, while the remaining page is utilized to store the redundancy metadata.

Figure 3:
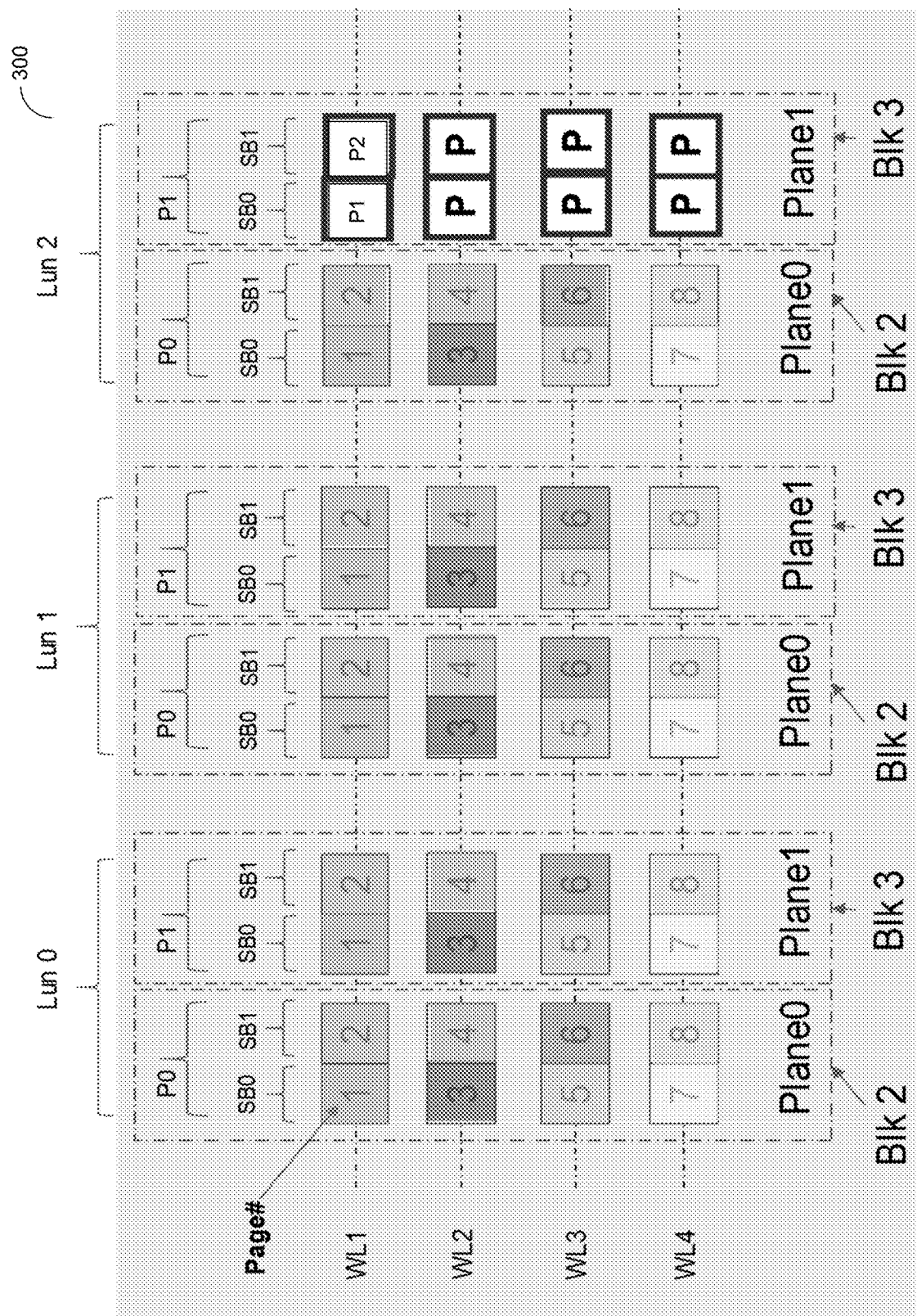
FIG. 3 schematically illustrates an example fault tolerant layout of a memory device, in accordance with embodiments of the present disclosure.

FIG. 3 schematically illustrates an example fault tolerant layout 300 of a memory device, in accordance with embodiments of the present disclosure. In the illustrative example of FIG. 3, one fault tolerant stripe is formed by pages having the first number within its plane (e.g., pages #1) across the planes and logical units of the memory device, such that all but one pages of the fault tolerant stripe are utilized to store the host data, while the last page P1 is utilized to store the redundancy metadata for the fault tolerant stripe. Another fault tolerant stripe is formed by pages having the second number within its plane (e.g., pages #2) across the planes and logical units of the memory device, such that all but one pages of the fault tolerant stripe are utilized to store the host data, while the last page P2 is utilized to store the redundancy metadata for the fault tolerant stripe. The numbers of logical units, planes, pages, wordlines, and fault tolerant stripes in the illustrative example of FIG. 3 are chosen for illustrative purposes and are not limiting; other implementations can use various other numbers of logical units, planes, pages, and fault tolerant stripes.

Since the above-described fault tolerant stripe includes one page of every plane of every logical unit, the fault tolerant stripe size is effectively limited by the number of planes multiplied by the number of logical units in the memory device. This can present an efficiency problem in low density devices with relatively small numbers of logical units and/or planes, since dedicating one page of each fault tolerant stripe to storing the redundancy metadata would incur the overprovisioning penalty of the inverse product of the number of logical units and the number of planes (i.e., Overprovisioning penalty=1/(number of LUNs*number of planes)). "Overprovisioning" herein shall refer to allocating a number of physical memory blocks which exceeds the logical capacity presented as available memory to the host.

Figure 4:
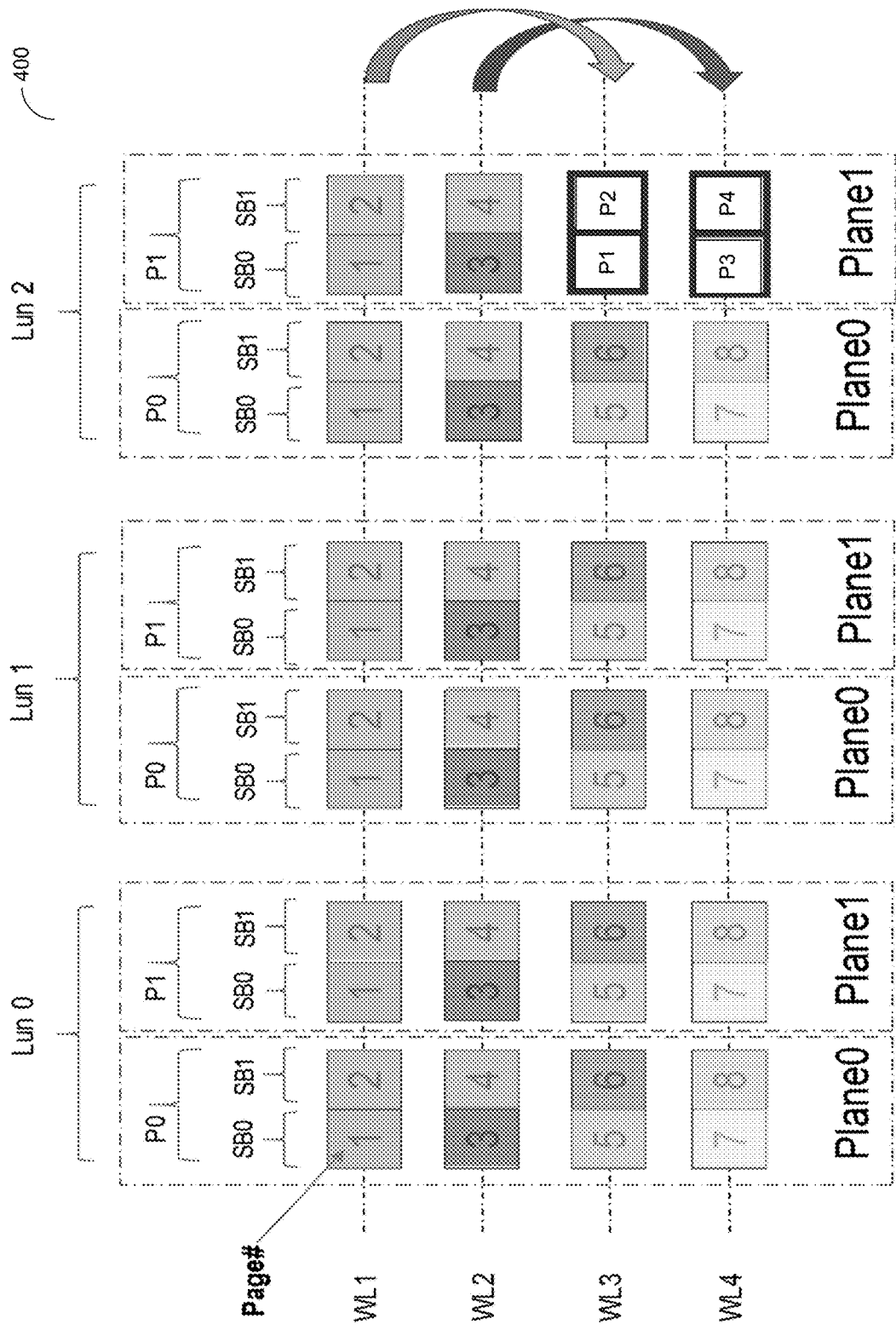
FIG. 4 schematically illustrates another example redundancy scheme of a memory device, in accordance with embodiments of the present disclosure.

Accordingly, one way of reducing the overprovisioning penalty involves forming a fault tolerant stripe utilizing multiple pages, rather than one page, from every plane of every logical unit of at least a subset of logical units of the memory device, as schematically illustrated by FIG. 4, which schematically illustrates an example fault tolerant layout 400 of a memory device, in accordance with embodiments of the present disclosure. In the illustrative example of FIG. 4, the first fault tolerant stripe is formed by pages having a first predefined number within its plane (e.g., pages #1) and pages having a second predefined number within its plane (e.g., pages #5) across the planes and logical units of the memory device, such that all but one pages of the fault tolerant stripe are utilized to store the host data, while the last page P1 is utilized to store the redundancy metadata for the fault tolerant stripe. The second fault tolerant stripe is formed by pages having the number that follows the first predefined number within its plane (e.g., pages #2) and pages having the number that follows the second predefined number within its plane (e.g., pages #6) across the planes and logical units of the memory device, such that all but one pages of the fault tolerant stripe are utilized to store the host data, while the last page P2 is utilized to store the redundancy metadata for the fault tolerant stripe. The third fault tolerant stripe is formed by pages #3 and pages #7 across the planes and logical units of the memory device, such that all but one pages of the fault tolerant stripe are utilized to store the host data, while the last page P3 is utilized to store the redundancy metadata for the fault tolerant stripe. The fourth fault tolerant stripe is formed by pages #4 and pages #8 across the planes and logical units of the memory device, such that all but one pages of the fault tolerant stripe are utilized to store the host data, while the last page P4 is utilized to store the redundancy metadata for the fault tolerant stripe, etc.

Notably, a physical defect on a wordline can affect not only pages residing on the same wordline, but also pages of one or more neighboring wordlines. Accordingly, each pair of pages from a given plane that participate in the same fault tolerant stripe can be separated by at least one wordline (e.g., page #1 and page #5, page #2 and page #6, etc.), as schematically illustrated by FIG. 5, which schematically illustrates an example fault tolerant layout 500 of a memory device, in accordance with embodiments of the present disclosure.

In various other examples and implementations, the pages from a given plane that participate in the same fault tolerant stripe can be separated by at least a specified number of wordlines (i.e., one or more wordlines). The probability of two pages of the same plane being simultaneously faulty decreases as the number of wordlines separating the two pages grows.

Figure 5:
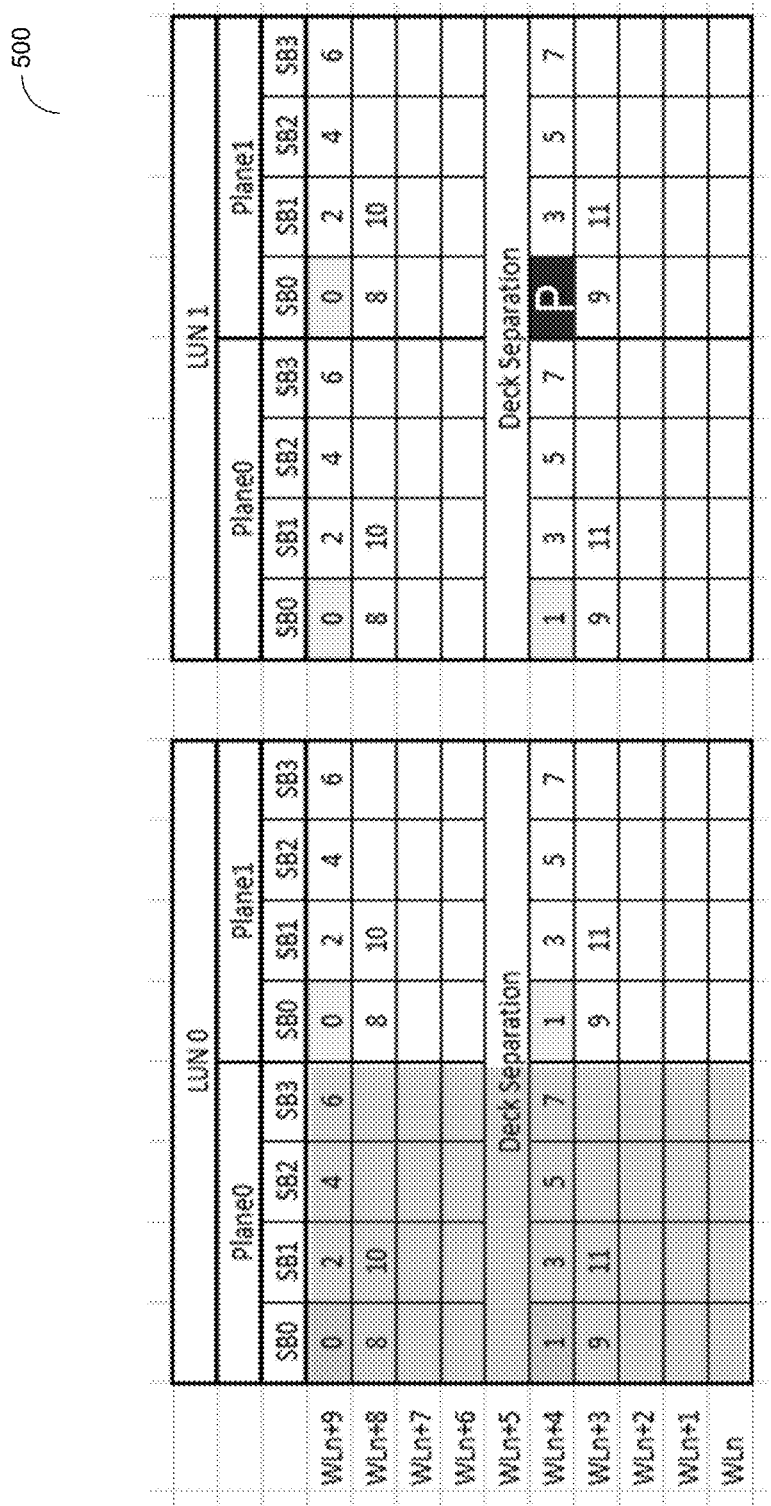
FIG. 5 schematically illustrates yet another example redundancy scheme of a memory device, in accordance with embodiments of the present disclosure.

The numbers of logical units, planes, pages, wordlines, and fault tolerant stripes in the illustrative example of FIG. 5 are chosen for illustrative purposes and are not limiting; other implementations can use various other numbers of logical units, planes, pages, and fault tolerant stripes.

Due to physical limitations of various memory device implementations, pages in can only be programmed in the ascending order of their respective page numbers within respective planes. Accordingly, forming a fault tolerant stripe utilizing multiple pages from every plane of every logical unit of at least a subset of logical units can necessitate keeping multiple fault tolerant stripes open, and thus would further require additional memory (e.g., on a non-volatile memory device of the memory sub-system) for storing the intermediate metadata. In an illustrative example, the contents of the pages can be summed, e.g., by the exclusive disjunction (XOR) operation, as the pages are programmed (i.e., as the contents of the pages is stored to the memory device), and the intermediate result of XOR operations can be stored in a memory until the fault tolerant stripe is closed (i.e., until the metadata is written to the last page of the fault tolerant stripe).

Figure 6:
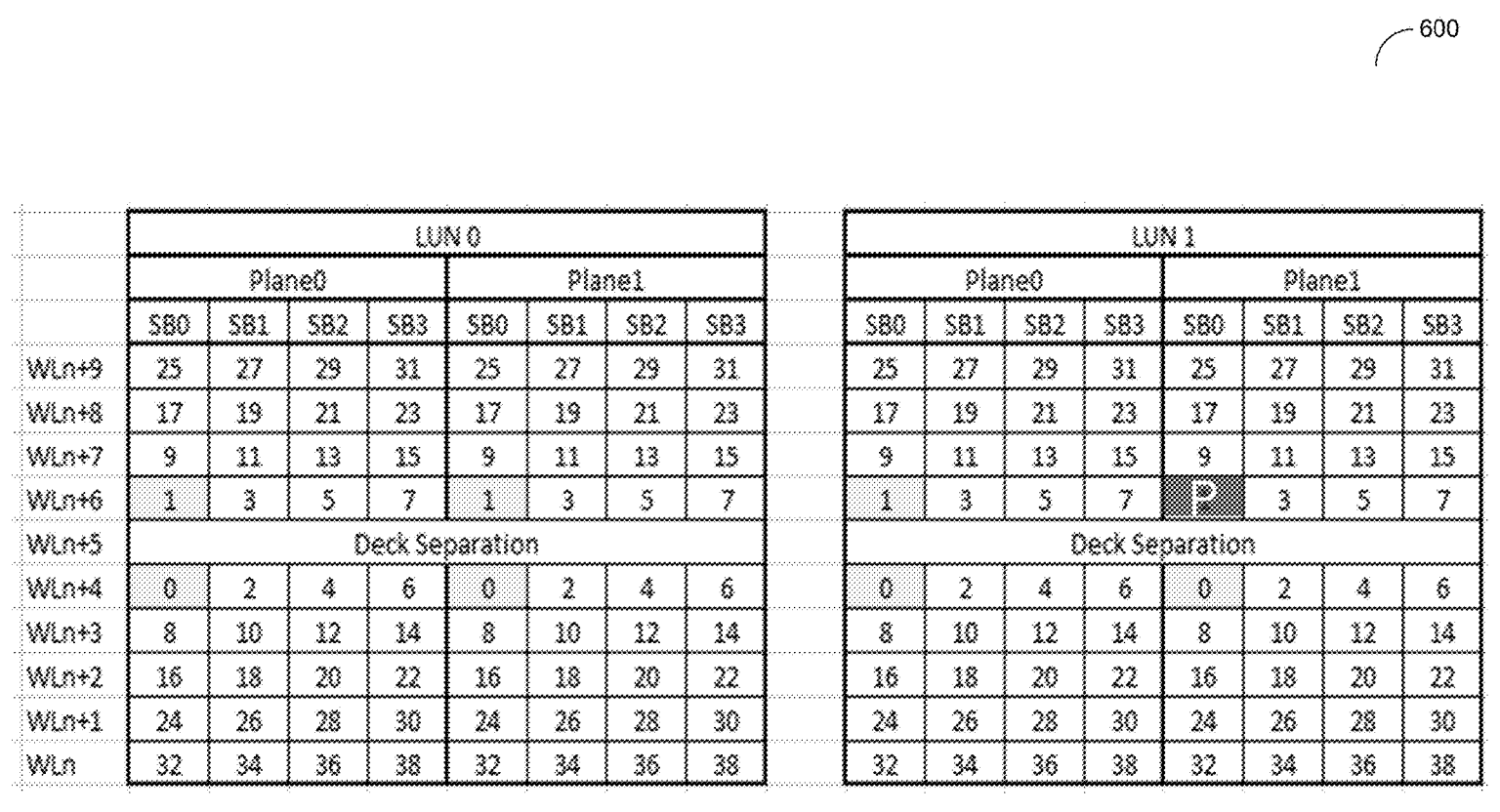

Accordingly, as schematically illustrated by FIG. 6, which schematically illustrates an example fault tolerant layout 600 of a memory device, in accordance with embodiments of the present disclosure, a fault tolerant stripe can be formed utilizing multiple pages having sequential page numbers from every plane of every logical unit of at least a subset of logical units of the memory device, provided that the pages residing within the same plane have sufficient wordline separation (e.g., are separated by at least a predetermined number of wordlines that include a deck separation wordline). The deck separation wordline refers to a dummy wordline, which includes no data pages. The deck separation wordline effectively splits the logical unit across all planes into the upper deck located above the deck separation wordline and the lower deck located below the word separation wordline.

In the illustrative example of FIG. 6, the first fault tolerant stripe is formed by pages having a first predefined number (e.g., pages #0) and pages having a second predefined number that follows the first predefined number (e.g., pages #1) across the planes and logical units of the memory device, such that all but one pages of the fault tolerant stripe are utilized to store the host data, while the last page P1 is utilized to store the redundancy metadata for the fault tolerant stripe. Page #0 is separated from page #1 by the deck separation wordline $WL_{n=5}$.

In operation, as the host data is coming in, having the first predefined number (e.g., pages #0) across all planes of all logical units are programmed, followed by programming the second predefined number (e.g., pages #1) across all planes of all logical units. The redundancy metadata can be computed by summing, e.g., by the exclusive disjunction (XOR) operation, the contents of the pages as the pages are programmed (i.e., as the contents of the pages is stored to the memory device), and the intermediate result of XOR operations can be stored in a memory until the fault tolerant stripe is closed (i.e., until the metadata is written to the last page of the fault tolerant stripe). Therefore, no additional memory is needed for storing the intermediate XOR results, as the XOR result of pages #0 can be continued to pages #1. After the last data page of the fault tolerant stripe is programmed, the XOR result is written to the memory device (page P in the illustrative example of FIG. 6).

The numbers of logical units, planes, pages, wordlines, and fault tolerant stripes in the illustrative example of FIG. 6 are chosen for illustrative purposes and are not limiting; other implementations can use various other numbers of logical units, planes, pages, and fault tolerant stripes.

Figure 7:
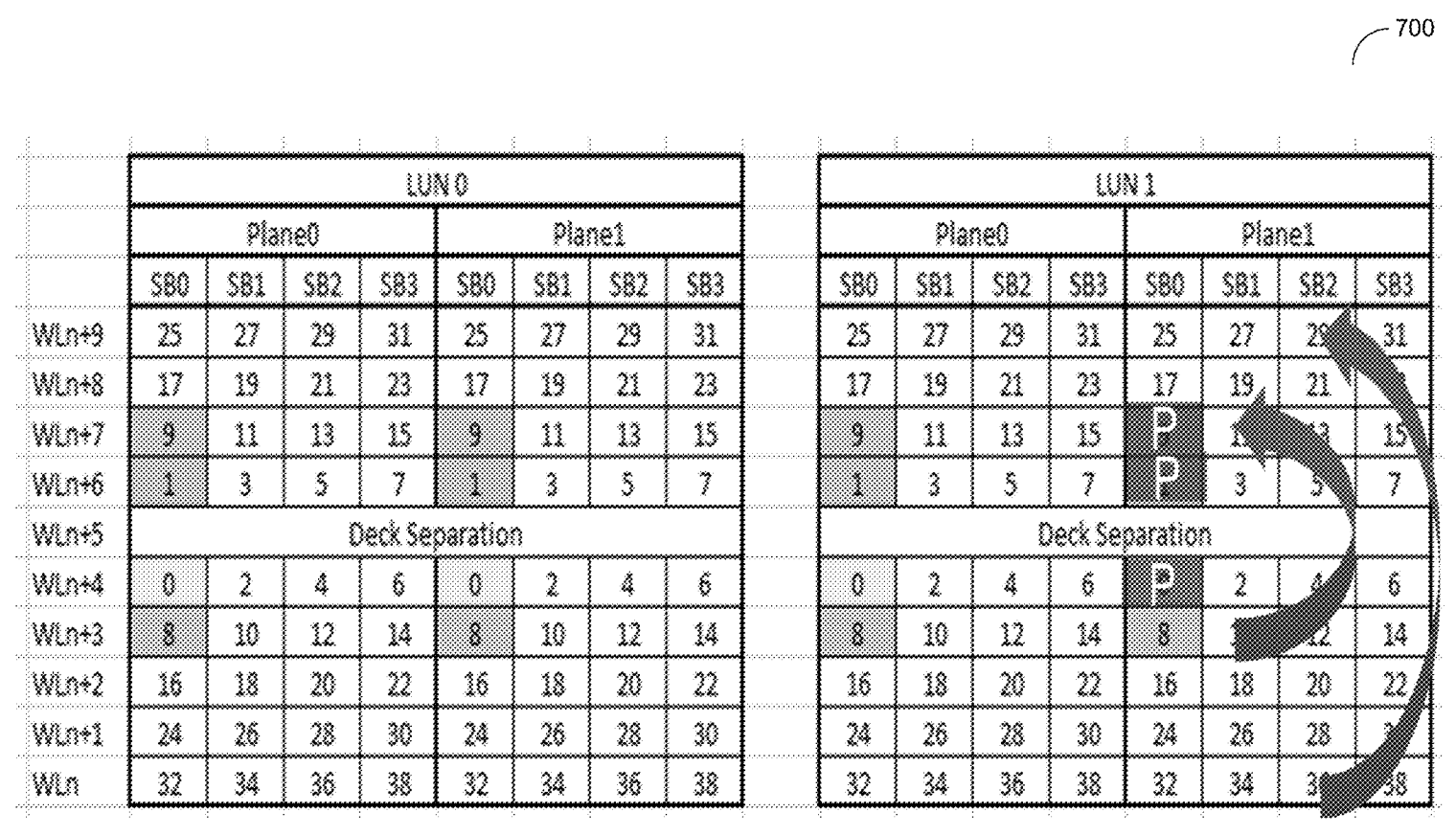

In some embodiments, the memory device layout can fail to provide the requisite wordline separation for at least some of the sequentially numbered pages. In an illustrative example of FIG. 7, which schematically illustrates an example fault tolerant layout 600 of a memory device, in accordance with embodiments of the present disclosure, pages having the first predetermined number (e.g., pages #0) and the second predetermined number following the first predetermined number (e.g., pages #1) are separated by a single wordline (the deck separation wordline), while the requisite number of separating wordlines can be two. Accordingly, fault tolerant stripes of at least two different sizes can be formed on the memory device: for pages residing on wordlines $WL_{n+4}$ and $WL_{n+6}$ that are adjacent to the deck separation wordline $WL_{n+5}$, "short" fault tolerant stripes can be formed, such that each fault tolerant stripe would only include a single page from every plane of every logical unit of at least a subset of the logical units of the memory device (similarly to the illustrative example of FIG. 4). The remaining "long" fault tolerant stripes can be formed to include two or more pages having sequential page numbers from every plane of every logical unit, since the pages (other than pages residing on wordlines $WL_{n+4}$ and $WL_{n+6}$ that are adjacent to the deck separation wordline $WL_{n+5}$) residing within the same plane have sufficient wordline separation.

As the wordline separation can increase as the page number increases, the fault tolerant stripe size can be dynamically adjusted in order to provide the requisite wordline separation, based on the layout of the memory device. Accordingly, in the illustrative example of FIG. 7, pages #0 and #1 are separated by a single wordline (the deck separation wordline), while the requisite number of separating wordlines can be three. Accordingly, fault tolerant stripes of at least two different sizes can be formed on the memory device: for pages residing on wordlines $WL_{n+4}$ and $WL_{n+6}$ that are adjacent to the deck separation wordline $WL_{n+5}$, "short" fault tolerant stripes can be formed, such that each fault tolerant stripe would only include a single page from every plane of every logical unit (similarly to the illustrative example of FIG. 4). Thus, each of pages #0 through #7 would have its own fault tolerant stripe.

Conversely, the wordlines starting from $WL_{n+3}$ and $WL_{n+7}$ provide the requisite wordline separation of at least three wordlines. Accordingly, "long" fault tolerant stripes can be formed to include two or more pages having sequential page numbers from every plane of every logical unit, provided that the pages reside on $WL_{n+3 \ldots n+1}$ and $WL_{n+7 \ldots n+9}$. For example, page #8 and page #9 have the sufficient wordline separation and thus can participate in a single fault tolerant stripe.

Accordingly, as the host data is coming in, pages are programmed to form fault tolerant stripes of a specified size, which can be predetermined in order to limit the overprovisioning penalty caused by implementing the fault tolerant scheme. Each fault tolerant stripe can include multiple data pages, while the last page of the fault tolerant stripe is dedicated to storing the redundancy metadata, which can be utilized for error detection and correction. Such a fault tolerant stripe can be formed utilizing multiple pages having sequential page numbers from every plane of every logical unit of at least a subset of logical units of the memory device, provided that the pages residing within the same plane have sufficient wordline separation (e.g., are separated by at least a predetermined number of wordlines that include a deck separation wordline).

The redundancy metadata can be computed by summing, e.g., by the exclusive disjunction (XOR) operation, the contents of the pages as the pages are programmed (i.e., as the contents of the pages is stored to the memory device), and the intermediate result of XOR operations can be stored in a memory until the fault tolerant stripe is closed (i.e., until the metadata is written to the last page of the fault tolerant stripe). Since the pages have sequential page numbers, no additional memory is needed for storing the intermediate XOR results, as the XOR result of pages #i can be continued to pages #i+1. After the last data page of the fault tolerant stripe is programmed, the XOR result is written to the memory device. The fault tolerant stripe size can be dynamically adjusted in order to provide the requisite wordline separation, based on the layout of the memory device.

Figure 8:
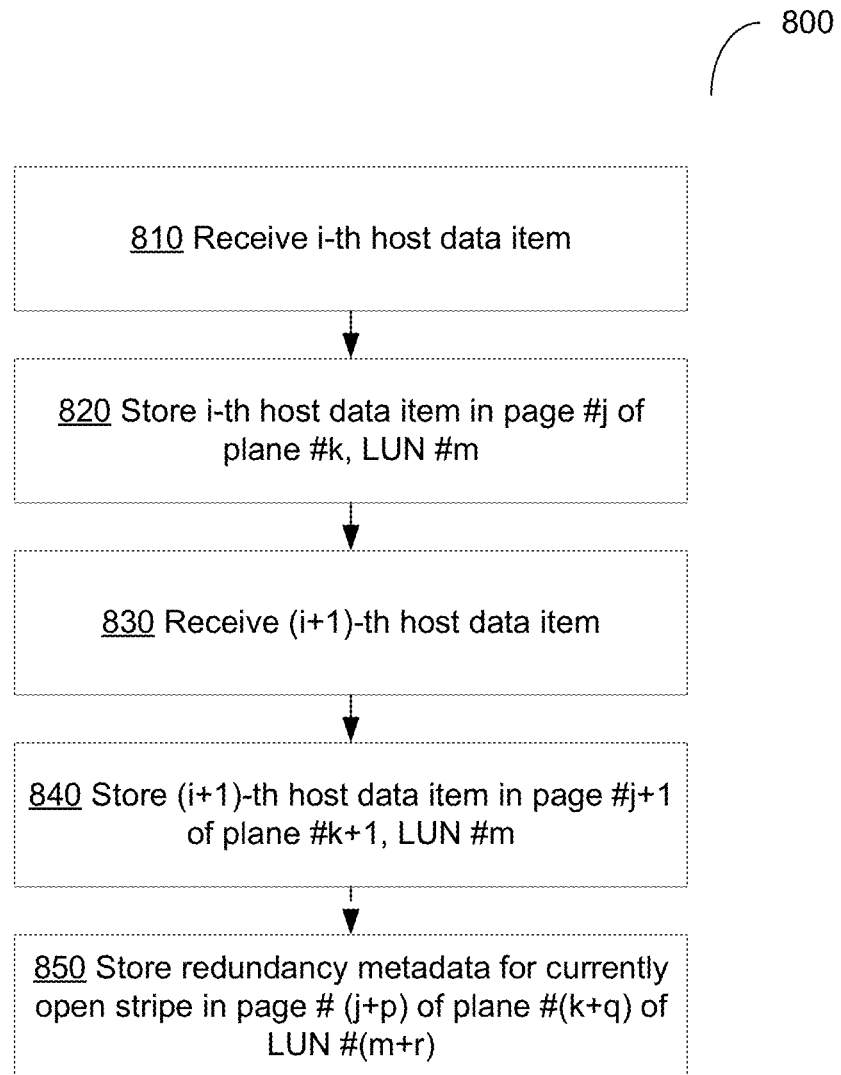
FIG. 8 is a flow diagram of an example method of implementing fault tolerant page stripes by a memory sub-system controller operating in accordance with some embodiments of the present disclosure.

FIG. 8 is a flow diagram of an example method 800 of implementing fault tolerant page stripes by a memory subsystem controller operating in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the fault tolerance manager 113 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 810, the processing device of the memory sub-system controller receives $i^{th}$ host data item (i.e., data to be stored on a memory device) from the host.

At operation 820, the processing device stores the $i^{th}$ host data item in the page #j of plane #k, LUN #m of a memory device. The page is associated with a currently open fault tolerant stripe.

At operation 830, the processing device receives the $(i+1)^{th}$ host data item from the host.

At operation 840, the processing device stores the second host data item in the page #j+1 of plane #k+1, LUN #m of the memory device. The page is associated with the currently open fault tolerant stripe. Based on the layout of the memory device, the page #j of plane #k+1 is separated from the page #j+1 of plane #k by at least a predetermined number of wordlines.

At operation 850, the processing device stores the redundancy metadata associated with the currently open fault tolerant stripe in page # (j+p) of plane #(k+q) of LUN #(m+r) of the memory device, thus closing the fault tolerant stripe.

Figure 9:
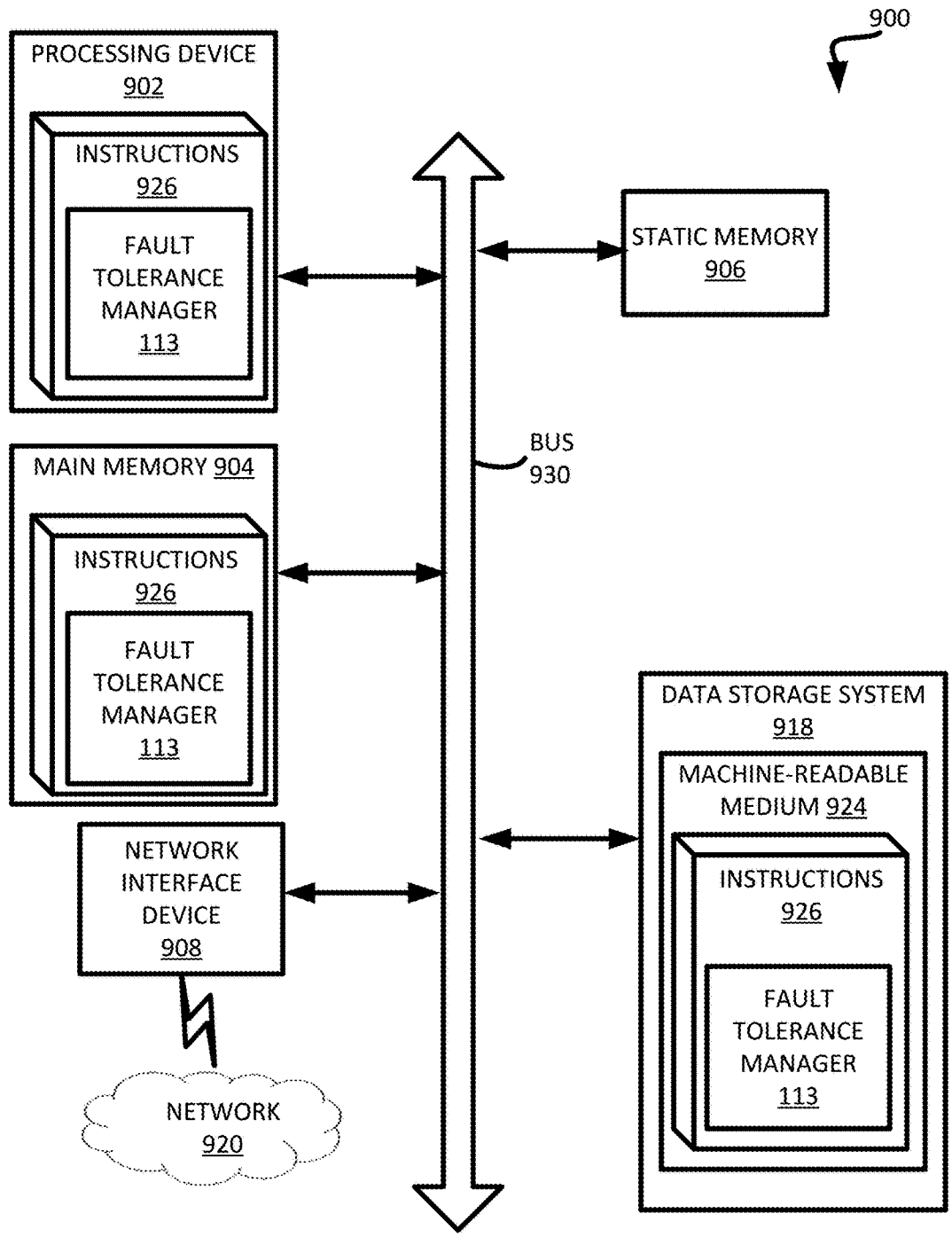
FIG. 9 is a block diagram of an example computer system in which implementations of the present disclosure can operate

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to a fault tolerance manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1.

In one embodiment, the instructions 926 include instructions to implement functionality corresponding to a fault tolerant stripe component (e.g., the fault tolerance manager 113 of FIG. 1). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
a memory device; and
a processing device, operatively coupled with the memory device, to perform operations, comprising:
receiving a first host data item;
storing the first host data item in a first page of a first logical unit of the memory device, wherein the first page is associated with a fault tolerant stripe;
receiving a second host data item;
storing the second host data item in a second page of the first logical unit of the memory device, wherein the second page is associated with the fault tolerant stripe, and wherein a size of the fault tolerant stripe is determined to provide a separation of the second page from the first page by at least a predetermined number of wordlines; and
storing, in a page of a second logical unit of the memory device, redundancy metadata associated with the fault tolerant stripe.

2. The system of claim 1, wherein the predetermined number of wordlines include a dummy wordline storing no host data.

3. The system of claim 1, wherein the fault tolerant stripe includes a specified number of pages.

4. The system of claim 1, wherein the redundancy metadata represents bitwise exclusive disjunction of a plurality of pages associated with the fault tolerant stripe.

5. The system of claim 1, wherein the first page and the second page have sequential page numbers.

6. The system of claim 1, wherein the operations further comprise:
storing a plurality of host data items in a plurality of pages associated with a second fault tolerant stripe, wherein a first size of the fault tolerant stripe is different from a second size of the second fault tolerant stripe.

7. The system of claim 1, wherein the predetermined number of wordlines include a deck separation wordline.

8. A method, comprising:
receiving, by a processing device of a memory subsystem controller, a first host data item;
storing the first host data item in a first page of a first logical unit of a memory device, wherein the first page is associated with a fault tolerant stripe;
receiving a second host data item;
storing the second host data item in a second page of the first logical unit of the memory device, wherein the second page is associated with the fault tolerant stripe, and wherein a size of the fault tolerant stripe is determined to provide a separation of the second page from the first page by at least a predetermined number of wordlines; and
storing, in a page of a second logical unit of the memory device, redundancy metadata associated with the fault tolerant stripe.

9. The method of claim 8, wherein the second page is separated from the first page by at least a predetermined number of wordlines.

10. The method of claim 8, wherein the fault tolerant stripe includes a specified number of pages.

11. The method of claim 8, wherein the redundancy metadata represents bitwise exclusive disjunction of a plurality of pages associated with the fault tolerant stripe.

12. The method of claim 8, wherein the first page and the second page have sequential page numbers.

13. The method of claim 8, further comprising:
store a plurality of host data items in a plurality of pages associated with a second fault tolerant stripe, wherein a first size of the fault tolerant stripe is different from a second size of the second fault tolerant stripe.

14. The method of claim 8, wherein the predetermined number of wordlines include a deck separation wordline.

15. A non-transitory computer-readable storage medium comprising executable instructions which, when executed by a processing device, cause the processing device to perform operations, comprising:
receiving a first host data item;

storing the first host data item in a first page of a first logical unit of a memory device, wherein the first page is associated with a fault tolerant stripe;

receiving a second host data item;

storing the second host data item in a second page of the first logical unit of the memory device, wherein the second page is associated with the fault tolerant stripe, and wherein a size of the fault tolerant stripe is determined to provide a separation of the second page from the first page by at least a predetermined number of wordlines; and storing, in a page of a second logical unit of the memory device, redundancy metadata associated with the fault tolerant stripe.

16. The non-transitory computer-readable storage medium of claim 15, wherein the predetermined number of wordlines include a dummy wordline storing no host data.

17. The non-transitory computer-readable storage medium of claim 15, wherein the fault tolerant stripe includes a specified number of pages.

18. The non-transitory computer-readable storage medium of claim 15, wherein the redundancy metadata represents bitwise exclusive disjunction of a plurality of pages associated with the fault tolerant stripe.

19. The non-transitory computer-readable storage medium of claim 15, wherein the first page and the second page have sequential page numbers.

20. The non-transitory computer-readable storage medium of claim 15, wherein the predetermined number of wordlines include a deck separation wordline.

\* \* \* \* \*